Aug. 26, 1958     E. W. BRUGMANN     2,849,388
CORROSION RESISTANT JACKETED METAL BODY
Filed May 22, 1945
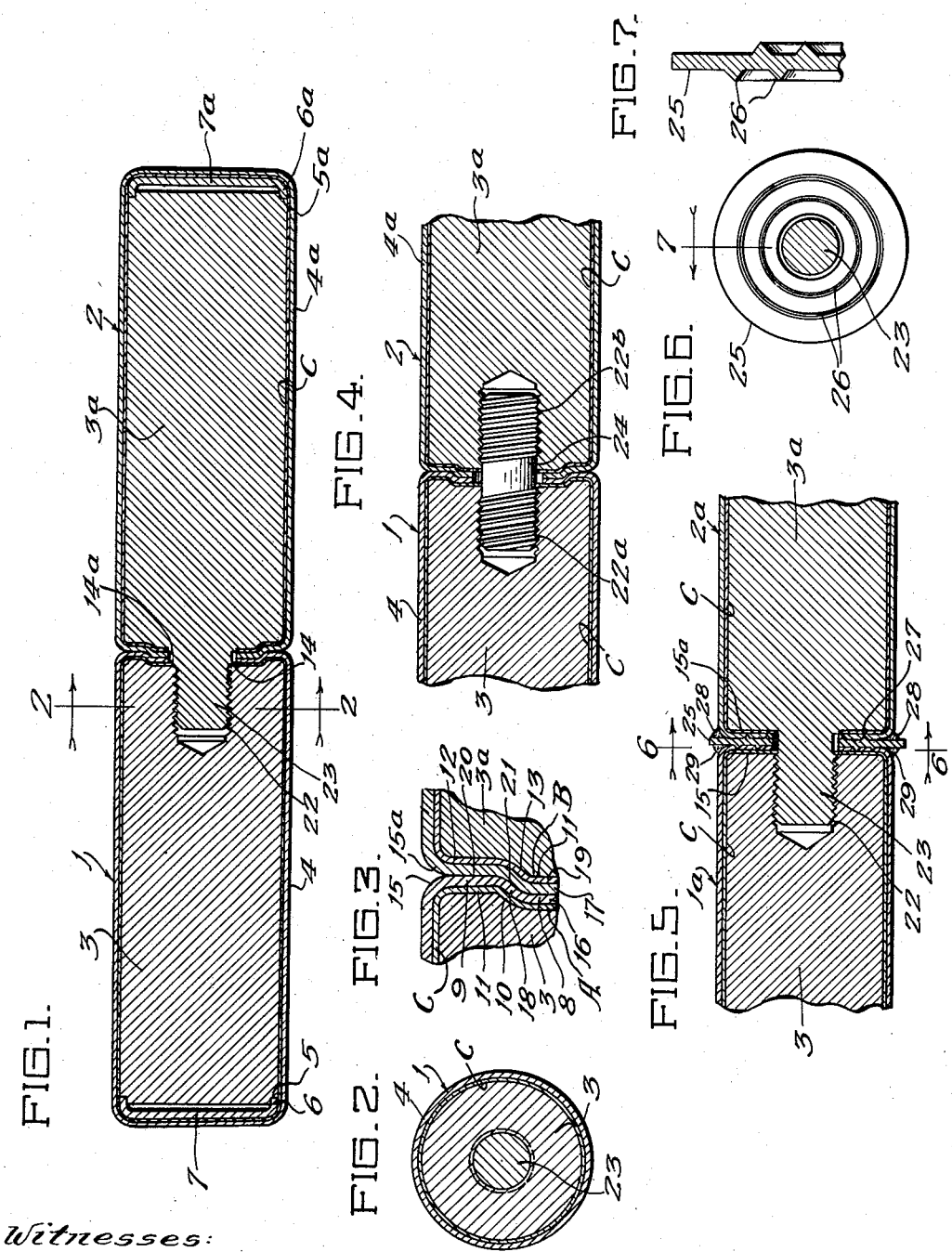

United States Patent Office 2,849,388
Patented Aug. 26, 1958

2,849,388

CORROSION RESISTANT JACKETED METAL BODY

Elmer W. Brugmann, Chicago, Ill., assignor to the United States of America as represented by the United States Atomic Energy Commission Application May 22, 1945, Serial No. 595,185

9 Claims. (Cl. 204—193.2)

This invention relates to new and useful improvements in metal jacketed metallic bodies, and more particularly to metallic bodies that are encased within relatively inert or corrosion resistant metal jackets and thereby effectively sealed from contact with external reactive gases and liquids.

In various uses of readily corrodible bodies such as rods, cylinders or other shapes, it is desirable that the bodies be provided with jackets or coverings of relatively inert or corrosion resistant metals over their exposed surfaces to prevent oxidation of the metal bodies upon exposure to gases or liquids that are reactive therewith. For example, uranium bodies or other fissionable bodies are passed successively through a tubular conduit or passage in which they are subjected to bombardment by neutrons for the purpose of producing various products including radioactive fission products, uranium isotopes and other products. The conduits or passages through which the bodies pass generally are only slightly larger in diameter than the bodies and, in order to maintain the surface temperature of the bodies within a desired range during neutronic bombardment thereof, there is passed through the conduit or passage and over the bodies a stream of a suitable coolant such as air or water. Uranium is highly reactive with the oxygen and moisture of air with water, particularly at elevated temperatures, and hence it is desirable that a suitable jacket or covering of a relatively inert corrosion resistant metal be provided upon the uranium body to prevent corrosion thereof.

The provision of protective jackets or coverings upon such readily corrodible metal bodies presents certain problems of a substantially more complex and difficult nature than merely the protection of the body from contact with coolant fluids with which the body is reactive. Thus, for example, in the typical use herein described, wherein uranium bodies are subjected to neutron bombardment while positioned in a tubular conduit or passage of restricted area, any inleakage of the coolant fluid through the jacket or covering into contact with the uranium body will react therewith to generate gases or other reaction products between the body and the enclosing jacket and to expand and distort the jacket outwardly thereby increasing the diameter of the jacketed body to an extent that it may become wedged or jammed within the conduit or passage and cannot be removed therefrom. When a uranium body that is undergoing neutron bombardment becomes wedged or jammed in this manner, an extremely dangerous condition is presented, and it is very desirable that the possibility of its occurrence be prevented.

It is essential, therefore, that the jacket or covering upon the body be proof against the inleakage of coolants or other fluids that are reactive in respect thereto. Furthermore, the problem must be considered from the point of view that some inleakage of the fluid coolant may occur; hence it is desirable that provision be made to prevent automatically the continued inleakage of such fluids and, also, in the event of continued inleakage, to provide for the dissipation of the generated reaction products from the jacketed body in a manner that will prevent swelling or lateral expansion and ultimate jamming of the jacketed body within the conduit or passage.

With the foregoing in mind, an object of the invention is to provide a novel jacketed metallic or other easily corrodible solid body comprising a plurality of open ended jacketed body sections secured endwise together in a manner to provide an effective leakproof seal therebetween.

Another object of the invention is to provide a novel jacketed body of the character set forth wherein the construction and arrangement of the jacket seal portions is such that, in the event of any inleakage of reactive fluids causing the generation of reaction products within the jacket, the pressure of the generated products tends to effect a closure of the jacket seal portions thereby preventing further inleakage of the reactive fluids.

A further object of the invention is to provide a novel metal jacketed metallic body of the stated character wherein the construction and arrangement of the jacket portions is such that, in the event of failure of the connection or joint between the sections, products generated therein may be dissipated endwise of the jacketed body sections thereby to prevent lateral expansion or swelling of the walls of the jacket sections and possible jamming of the jacketed body sections within the conduit or passage.

These and other objects of the invention, and the various features and details of the construction and arrangement thereof are hereinafter set forth and described with reference to the accompanying drawing, in which:

Fig. 1 is a sectional view taken along the longitudinal axis of a metal jacketed metallic body embodying the present invention.

Fig. 2 is a sectional view taken on line 2—2 of Fig. 1.

Fig. 3 is an enlarged fragmentary sectional view showing the detailed construction and arrangement of the interfitting abutting end faces of the jacketed body sections that provide a fluid-tight seal therebetween.

Fig. 4 is a fragmentary sectional view similar to Fig. 1 showing a modified construction of the jacketed metal body.

Fig. 5 is a fragmentary sectional view similar to Fig. 4 showing another modified construction of the jacketed body.

Fig. 6 is an elevational view taken on line 6—6, Fig. 5 of a washer or disk element embodied in the jacketed body construction shown in Fig. 5; and Fig. 7 is an enlarged fragmentary sectional view taken on line 7—7, Fig. 6.

Referring now to the accompanying drawings, and particularly to Figs. 1 and 2, thereof, there is shown one embodiment of a metal jacketed metallic body, made according to the present invention, and comprising generally a plurality of jacketed body sections 1 and 2, respectively, that are mechanically secured together in endwise abutting relation. Each of the jacketed body sections 1 and 2 comprises an elongated corrosible metal body section 3 and 3a, respectively, for example, of cylindrical shape, that is substantially encased within a jacket or container 4, 4a, of relatively corrosion resistant metal such as, for example, aluminum, stainless steel, or the like.

In the illustrated embodiments of the invention, the jackets of containers 4 and 4a are of generally cup-shaped configuration open at one end and having an internal diameter such as to snugly receive the metal body sections 3 and 3a, respectively. In order to provide for the efficient thermal conduction of heat outwardly from the body sections to the jackets or containers and thereby insure effective cooling of the jacketed bodies by means of a coolant passing thereover, the jackets 4 and 4a may be securely bonded to their respective body sections 3 and 3a by means of a suitable bonding material applied, for example, to the surface of the body sections in the form of a coating C by dipping the sections in a molten bath of the selected bonding material. Any suitable metal alloys having good thermal conduction properties and melting points somewhat below that of the jackets 4 and 4a, such as aluminum-silicon and zinc-tin alloys, may be employed for this purpose. However, for reasons that appear hereinafter, it is preferred that the bonding material be of a type that is corrodible by the coolant in preference to the metal body sections in the event of any inleakage of the coolant inwardly of the jacketed body. The class of bonding materials that are suitable for this purpose are zinc-tin alloys.

In manufacturing the jacketed body and prior to coating the body sections with the selected bonding material, the outer end face of each body section 3 and 3a may be rabbeted as indicated at 5 and 5a, respectively, to receive the inturned edge portions 6 and 6a of an insulating disk element 7 or 7a, as the case may be, the inturned edge portions of the disk elements 7 and 7a being of greater length than the axial depth of the rabbets 5 and 5a so that the central portion of the disk elements is spaced from the adjacent end faces of the body sections to provide between the disk elements and the end faces of the body sections a substantially sealed or closed air gap that functions as a thermal insulator to minimize the conduction of heat endwise from the body sections to the end portions of their jackets or containers 4 and 4a. The disk elements 7 and 7a may be composed of the same metal as the jackets or containers or may be made of a fissionable metal such as uranium.

As previously stated, the invention is directed particularly to the provision of an efficient leakproof or fluid tight seal or joint between the adjacent jacketed sections and as well to the provision of novel means for effectively securing together the adjacent sections of the body. To these ends, therefore, and as more clearly shown in Fig. 3, prior to coating the uranium bodies with the selected bonding material, the open inner end faces of the bodies also may be machined to provide, for example, the inner end face of the body section 3, inner and outer concentric annular seat portions 8 and 9 respectively, the former being recessed relative to the latter a slight distance in a direction axially of the body 3 and providing between it and the outer seat 9, a continuous annular shoulder portion 10 that is angularly disposed or beveled. Similarly the open inner end face of the other body section 3a is machined to provide an inner annular seat portion 11 and a recessed or offset outer seat portion 12 intermediate which is provided a continuous angularly disposed or beveled shoulder portion 13, the portions 11, 12 and 13 of the body section 3a being correspondingly arranged with respect to the machined portions 8, 9 and 10 of the body section 3.

After machining the inner or adjacent end faces of the body sections as aforesaid, and with the disk elements 5 and 5a fitted on the opposite or outer ends thereof as described, the body sections may be coated with a coating C of the selected bonding material and then slipped endwise into their jackets or containers 4 and 4a respectively, whereupon the coating solidifies and creates an effective thermally conductive bond between the metal body sections 3 and 3a and the jackets or containers 4 and 4a respectively positioned thereon.

The jackets or containers 4 and 4a are made initially to have a depth somewhat greater than the axial length of the metal body sections 3 and 3a, respectively, in order to provide a projecting jacket edge portion at the open end thereof that may be turned or spun inwardly over the inner machined end face of its body section leaving openings 14 and 14a, respectively, of reduced diameter centrally in the adjacent end faces of the jacketed sections 1 and 2. In order that the inturned edge portions 15 and 15a of the jackets may conform to the machined contour of the relatively axially spaced inner and outer seat and shoulder portions 8, 9, 10 and 11, 12, 13 of their respective body sections, with the inner surfaces of said jacket edge portions, the inturned edge portions of the jackets may be pressed or forced into conforming contact with the machined end face portions of the respective uranium bodies 3 and 3a.

In addition, and in order to provide accurately registering and interfitting seat portions on the exterior surfaces of the inturned jacket edges 15 and 15a, the latter preferably are machined, in a manner similar to the end faces of the body sections 3 and 3a, to provide in the jacket edge 15 of the one jacketed section 1, relatively inner and outer concentric annular seat portions 16 and 17, respectively, that are relatively offset axially of each other and connected by an angular or bevelled shoulder portion 18, and to provide on the other jacketed section 2 correspondingly offset inner and outer annular seat portions 19 and 20 connected by a similar angular or bevelled shoulder portion 21, the respective seat and shoulder portions being arranged for interfitting engagement with each other in the relation shown in Figs. 1 and 3 of the drawings when the jacketed body sections 1 and 2 are secured in the endwise abutting relation illustrated.

In accordance with the present invention, the jacketed body sections 1 and 2 of the body are secured together to provide an efficient leakproof seal between the aforesaid abutting seat and shoulder portions of the inturned jacket edge portions 15 and 15a. In one embodiment of the invention this may be effectively accomplished mechanically by providing, for example, in the body section 3, a tapped socket 22 that extends axially inward of the body section 3 in alignment with the central opening 14 through the jacket 4 that is bounded by the inturned jacket edge portion 15, and by providing on the other body section 3a an integral threaded projection 23 that extends axially outward through the central opening 14a defined or bounded by the inturned edge portion 15a of its jacket section 4a.

The projection 23 of the body section 3a is constructed and arranged for threaded engagement with the tapped socket 22 in the body section 3 to effectively secure the jacketed sections 1 and 2 tightly and rigidly together and at the same time establish an efficient fluid-tight seal between the section 1 and 2 by the resulting compression of the abutting seat and shoulder portions provided on the inturned edge portions 15 and 15a of the respective jacket sections 4 and 4a. In this connection, it is to be noted that by reason of the bevelled or angular disposition of the shoulder portions 10 and 13 intermediate the relatively offset inner and outer annular seat portions 8, 9 and 11, 12 respectively, when the jacketed sections are screwed tightly together there is provided a higher unit compression in and between said shoulder portions 10 and 13 than is established between the other abutting surfaces. This higher compression functions effectively to establish an efficient fluid-tight seal between the abutting jacketed body sections 1 and 2 that precludes the inleakage of reactive coolant or other fluids into contact with the metal body sections 3 and 3a.

While the aforesaid construction and arrangement of the joint or connection between the jacketed body sections 1 and 2 provides a metal body that is effectively sheathed and protected from contact with reactive or other fluids, the construction of my invention also embodies features that afford certain advantages and safety factors in the event of the inleakage of such fluids through the seal provided between the abutting seat and shoulder surfaces of the inturned jacket edge portions 15 and 15a.

Thus, should fluid leak inwardly between and through the abutting jacket seal portions, the fluid will preferentially react with and corrode the selected bonding material in the region or area inwardly of and behind the inturned jacket edge portions 15 and 15a, for example, as indicated at A and B, respectively, and this corrosive action is accompanied by the generation of reaction products that collect and exert substantial pressure by reason of the increased bulk volume of the reaction products inwardly of, or behind, the inturned jacket edge portions 15 and 15a, as indicated. The pressures established thereby in the regions or areas A and B cannot be relieved in a direction laterally or axially outward due to the presence of the adjacent metal body sections and hence the expansion forces of the generated reaction products must react in opposition to each other thereby urging or forcing the adjacent abutting seal portions of the jacket edges 15 and 15a into tighter surface contact with one another to re-establish the seal therebetween and preclude further inleakage of reactive cooling or other fluids.

Another advantage of the construction comprehended by this invention resides in the provision of the central openings in the inner adjacent end faces of the jacketed body sections 1 and 2. Thus, for example, should the mechanical connection between the body sections for any reason fail, and the sections 1 and 2 become separated thereby exposing the adjacent ends of the metal body sections 3 and 3a to the reactive coolant through the central openings 14 and 14a in the jacket sections 4 and 4a, respectively, the reaction products that are generated are afforded ready egress endwise of the jacketed sections 1 and 2 through said end openings and into the surrounding conduit or passage with the result that such products do not become trapped within the sections and generate sufficient pressure therein to swell or expand the jackets 4 and 4a so that they become wedged or jammed within the conduit or passage. Thus upon failure corrosion products are washed away so that the tendency of the slug to jam in the tube is reduced and the amount of activity in the cooling water by which the failure can be detected, is increased.

Referring now to Fig. 4 there is illustrated another embodiment of the invention that is identical to that shown in Figs. 1 and 3 except for the particular connection provided for securing the jacketed body sections 1 and 2 together, and hence the same reference numerals are employed in Fig. 4 to designate identical structural parts and features. With reference to Fig. 4, it will be noted that instead of providing the metal body section 3a with an integral axial projection 23 that is threaded for screw engagement with a tapped socket 22 in the other body section 3 as in Fig. 1, in the embodiment of the invention illustrated in Fig. 4, each of the body sections 3 and 3a may be provided with a tapped socket 22a and 22b, respectively, formed coaxially of the body sections inwardly of the inner adjacent end faces thereof. In this form of the invention, the sockets 22a and 22b are tapped and the jacketed body sections 1 and 2 may be secured tightly together by means of an independent or separate stud 24, for example, of the same metal as the body sections 3 and 3a, threaded for cooperative engagement with the threads provided in the tapped sockets 22a and 22b. In all other respects, the construction and arrangement of the parts of the jacketed body sections 1 and 2 are as described with reference to the embodiments of the invention shown in Fig. 1, and the function and operation of the abutting seat and shoulder portions of the inturned jacket edge portions 15 and 15a to provide a fluid-tight seal therebetween is the same as that previously described herein.

Referring next to Figs. 5, 6 and 7 of the drawing, there is illustrated a further embodiment of the invention that comprises essentially the mechanical construction shown in Fig. 1 together with an additional weld or braze connection between the jacketed sections 1 and 2 that affords greater security against the possible inleakage of reactive cooling or other fluids. Thus, in the particular embodiment of the invention shown in the Figs. 5, 6 and 7, machining of the inner adjacent end faces of the respective body and jacket sections to provide relatively offset inner and outer annular seat portions and connecting angular shoulders may be dispensed with, and the edge portions 15 and 15a of the respective jacket sections 4 and 4a may be turned or spun inwardly over the flat end faces of their body sections so that they reside in common planes normal to the longitudinal axis of the jacketed body sections as shown.

In this form of the invention there may be interposed between the plane inturned jacket edge portions 15 and 15a of the respective sections an annular disk or washer-like element 25 that may be provided with one or more spaced concentric continuous ribs or the like 26 constructed and arranged to engage and interfit within correspondingly formed recesses or grooves 27 cut or otherwise formed in the inturned jacket edge portions 15 and 15a respectively, to increase the effectiveness of the fluid-tight seal between the surfaces of the washer element and the inturned jacket edge portions. The establishment of this seal is advantageous since it prevents inleakage of water during use and also prevents entrappment of welding or brazing.

The jacketed body sections 1a and 2a are secured tightly together with the washer 25 interposed between the inturned jacket edge portions 15 and 15a by relative rotation of the sections to interengage the threaded integral projection 23 and the tapped socket 22 as shown. After the jacketed body sections 1a and 2a have been secured tightly together, as aforesaid, the sections may be additionally secured together by means of welds or brazes 28 and 29 between opposite faces of the washer 25 and the adjacent exterior surface of the jacket sections 4 and 4a, respectively. An effective leak-proof seal is thus provided between the jacketed body sections 1a and 2a and, in the event of the inleakage of any reactive cooling fluid the construction of the jacketed sections functions as previously set forth herein to re-establish the seal and prevent further inleakage of fluid. Likewise, the construction is such that in the event of failure of the connections or joints between the jacketed sections, the corrosion products that are generated as the result of exposure of the body sections 3 and 3a to reactive fluids are dissipated as herein set forth without causing lateral expansion or swelling of the jacketed sections that might result in the sections becoming jammed or wedged in the surrounding conduit or passage in which disposed.

To facilitate welding operations, the disk or washer element 25 preferably is of slightly greater diameter than the jacket sections 4 and 4a, as shown, and, after completion of the welds 28 and 29, the element 25 and the excess metal of the welds may be machined down to the diameter of the jacket sections thereby providing a continuous flush surface on the exterior of the jacketed body. In accordance with a further modification the disk 25 may be constructed of a low melting brazing or welding metal and the metal projecting from the jacket may be used as a source of a measured quantity of weld or braze metal for use in the welding operation. Disks of aluminum silicon alloy containing 88 percent or more of aluminum and a major portion of the balance silicon are suitable when the jacket is commercial aluminum.

From the foregoing, it will be observed that this invention provides a novel metal jacketed metal body construction comprising a plurality of open ended jacketed body sections that are tightly secured together in endwise abutting relation in a manner to provide an effective fluid-tight seal therebetween. In addition, the construction and arrangement of the jacketed sections and the seal provided therebetween is such that any reactive fluid leaking inwardly through the seal will cause the generation of reaction products at pressures operable to effect a re-closure of the seal and preclude further fluid inleakage. Furthermore, the construction is such that, in the event of failure of the connection or joint between the sections exposing the ends of the metal bodies to the surrounding fluid, the generated corrosion products will be dissipated endwise outwardly of the jacketed sections thereby precluding swelling or expansion of the jackets in a radial direction so that the possibility of the jacketed sections becoming wedged or jammed in the surrounding circuit or passage is substantially eliminated.

A jacketed body having a welded joint is disclosed and claimed in the copending application of the same inventor filed May 1, 1945, Serial No. 591,302.

While certain embodiments of the invention have been illustrated and described herein, it is not intended that the invention be limited to such disclosures, and changes and modifications may be made and incorporated as desired without departure from the invention as defined by the scope of the following claims.

It is claimed:

1. A metal jacketed metallic body comprising a plurality of metal jacketed metallic body sections disposed in endwise relation and having their metal jackets overlying only the peripheries of, and interposed between, the adjacent end faces of said metallic body sections in relatively confronting relation, and thread and screw means centrally of said faces securing said jacketed body sections tightly together in said endwise relation and compressing said overlying jacket portions to provide a fluid-tight seal therebetween.

2. A metal jacketed metallic body comprising a plurality of metal jacketed metallic body sections disposed in endwise relation and having their metal jackets overlying only the peripheries of, and interposed between, the adjacent end faces of said metallic body sections in relatively confronting relation, the adjacent end face of one of said metallic body sections having a tapped socket axially therein, and a threaded axial projection on the adjacent face of the other of said body sections cooperatively engaging the tapped socket of said one body section to secure said jacketed body sections tightly together in said endwise relation and provide a fluid-tight seal therebetween by compression of said overlying jacket portions.

3. A metal jacketed metallic body comprising a plurality of metal jacketed metallic body sections disposed in endwise relation and having their metal jackets overlying only the peripheries of, and interposed between, the adjacent end faces of said metallic body sections in relatively confronting relation, the adjacent end face of each of said metallic body sections having a tapped socket axially therein with the threads of the socket in one body section arranged reversely with respect to the threads of the socket in the other body section, and a reversely threaded stud cooperatively engaging the tapped sockets in said body sections to secure the jacketed body sections tightly together and provide a fluid tight seal therebetween by compression of said overlying jacket portion.

4. A metal jacketed metallic body comprising a plurality of metal jacketed metallic body sections disposed in endwise relation and having their metal jackets overlying only the peripheries of, and interposed between, the adjacent end faces of said metallic body sections in abutting surface contact therewith and with each other, said abutting jacket portions having relatively axially offset interengaging inner and outer annular surface portions and connecting angularly disposed shoulder portions cooperable to provide a fluid-tight seal therebetween, and thread and screw means centrally of said faces securing said jacketed body sections tightly together in said endwise relation operable to compress together said interengaging abutting jacket portions to provide a fluid-tight seal therebetween.

5. A metal jacketed metallic body comprising a plurality of metal jacketed metallic body sections disposed in endwise relation and having their metal jackets overlying only the peripheries of, and interposed between, the adjacent end faces of said metallic body sections in abutting surface contact therewith and with each other, said abutting jacket portions having relatively axially offset interengaging inner and outer annular surface portions and connecting angularly disposed shoulder portions cooperable to provide a fluid-tight seal therebetween, the adjacent end face of one of said metallic body sections having a tapped socket axially therein, and a threaded axial projection on the adjacent face of the other of said body sections cooperatively engaging the tapped socket of said one body section to secure said jacketed body sections tightly together in said endwise relation and effect a fluid-tight seal between said abutting jacket portions by compression thereof.

6. A metal jacketed metallic body comprising a plurality of metal jacketed metallic body sections disposed in endwise relation and having their metal jackets overlying only the peripheries of, and interposed between, the adjacent end faces of said metallic body sections in abutting surface contact therewith and with each other, said abutting jacket portions having relatively axially offset interengaging inner and outer annular surface portions and connecting angularly disposed shoulder portions cooperable to provide a fluid-tight seal therebetween, the adjacent end face of each of said metallic body sections having a tapped socket axially therein with the threads of the socket in one body section arranged reversely with respect to the threads of the socket in the other body section, and a reversely threaded stud cooperatively engaging the tapped sockets in said body sections to secure the jacketed body sections tightly together and provide a fluid-tight seal between said abutting jacket portions by compression thereof.

7. A metal jacketed metallic body comprising a plurality of metal jacketed metallic body sections disposed in endwise relation and having their metal jackets overlying only the peripheries of, and interposed between, the adjacent end faces of said metallic body sections in relatively confronting relation, an annular disk element interposed between said relatively confronting jacket portions, and screw and thread means centrally of said faces securing said jacketed body sections tightly together in endwise abutting relation with respect to said interposed disk element and providing a fluid-tight seal therebetween by compression of said overlying jacket portions.

8. A metal jacketed metallic body comprising a plurality of metal jacketed metallic body sections disposed in endwise relation and having their metal jackets overlying only the peripheries of, and interposed between, the adjacent end faces of said metallic body sections in relatively confronting relation, an annular disk element interposed between said relatively confronting jacket portions, the adjacent end face of one of said metallic body sections having a tapped socket axially therein, and a threaded axial projection on the adjacent end face of the other of said body sections cooperatively engaging the tapped socket of said one body section to secure said jacketed body sections tightly together in said endwise relation and provide a fluid-tight seal therebetween by compression of said overlying jacket portions.

9. A metal jacketed metallic body comprising a plurality of metal jacketed metallic body sections disposed in endwise relation and having their metal jackets overlying only the peripheries of, and interposed between, the adjacent end faces of said metallic body sections in abutting surface contact therewith and with each other, said abutting jacket portions having relatively axially offset interengaging inner and outer annular surface portions and connecting angularly disposed shoulder portions cooperable to provide a fluid-tight seal therebetween, and a coating of a material having a higher corrosion rate than the body sections intermediate said body sections and jackets providing a thermally conductive preferentially corrodible bond therebetween, and means securing said jacketed body sections tightly together in said endwise relation operable to compress together said interengaging abutting jacket portions and provide a fluid-tight seal therebetween.

References Cited in the file of this patent

UNITED STATES PATENTS

| | | |
|---|---|---|
| 114,138 | Hersey | Apr. 25, 1871 |
| 201,059 | Smith | Mar. 5, 1878 |
| 894,480 | Bruce | July 28, 1908 |
| 1,127,256 | Jewell | Feb. 2, 1915 |
| 1,788,565 | Davis | Jan. 13, 1931 |
| 1,904,732 | Haueisen | Apr. 18, 1933 |
| 1,957,169 | Kanter | May 1, 1934 |

FOREIGN PATENTS

| | | |
|---|---|---|
| 861,390 | France | Feb. 7, 1941 |